United States Patent
Hämmerle et al.

(10) Patent No.: US 11,845,035 B2
(45) Date of Patent: Dec. 19, 2023

(54) SELF-CLEANING AIR FILTER SYSTEM

(71) Applicant: AGCO International GmbH, Neuhausen (CH)

(72) Inventors: Stefan Hämmerle, Marktoberdorf (DE); Peter Gast, Marktoberdorf (DE); Andreas Kleinhenz, Marktoberdorf (DE); Thorsten Capelle, Marktoberdorf (DE); Andreas Reisch, Marktoberdorf (DE); Hans Leistle, Marktoberdorf (DE)

(73) Assignee: AGCO International GmbH, Neuhausen (CH)

(*) Notice: Subject to any disclaimer, the term of this patent is extended or adjusted under 35 U.S.C. 154(b) by 0 days.

(21) Appl. No.: 18/007,016

(22) PCT Filed: Jul. 19, 2021

(86) PCT No.: PCT/IB2021/056508
§ 371 (c)(1),
(2) Date: Jan. 26, 2023

(87) PCT Pub. No.: WO2022/029533
PCT Pub. Date: Feb. 10, 2022

(65) Prior Publication Data
US 2023/0191308 A1      Jun. 22, 2023

(30) Foreign Application Priority Data
Aug. 5, 2020  (GB) ...................................... 2012138

(51) Int. Cl.
*B01D 46/00*        (2022.01)
*B01D 46/44*        (2006.01)
(Continued)

(52) U.S. Cl.
CPC ......... *B01D 46/71* (2022.01); *B01D 46/0086* (2013.01); *B01D 46/446* (2013.01);
(Continued)

(58) Field of Classification Search
CPC ........ B01D 46/24; B01D 46/46; B01D 46/71; B01D 46/0086; B01D 46/446; B01D 46/448; B01D 2279/60; F02M 35/086
(Continued)

(56) References Cited

U.S. PATENT DOCUMENTS 3,766,715 A * 10/1973 Archer .................. G01N 27/16
                                                           73/23.31
4,786,293 A * 11/1988 Labadie ................. B01D 46/71
                                                           95/20
(Continued)

FOREIGN PATENT DOCUMENTS

WO    2019118744 A1    6/2019

OTHER PUBLICATIONS

UK Intellectual Property Office, Search report for related UK Application No. GB2012138.0, dated Dec. 8, 2020, 3 pages.
(Continued)

*Primary Examiner* — Minh Chau T Pham

(57) ABSTRACT

A method of operating a cleaning process on a filter in a vehicle air intake includes passing air through the filter from an upstream side to a downstream side, and providing an exhaust duct having an inlet end adjacent the upstream side of the filter and an outlet end adjacent a cooling fan or other air-extraction device of the vehicle arranged to draw air through the exhaust duct from the inlet end to the outlet end. In a periodic cleaning subroutine, the rotational speed of the fan is increased from a first speed to a second speed, while a pulse of pressurized fluid is applied to a downstream side of the filter. The exhaust duct carries away material dis-
(Continued)

lodged from the upstream side of the filter by the applied pulse, and the rotational speed of the fan is reduced to its original level.

16 Claims, 8 Drawing Sheets

(51) Int. Cl.
  *B01D 46/46* (2006.01)
  *B01D 46/71* (2022.01)
  *F02M 35/08* (2006.01)
  *F01P 5/02* (2006.01)
  *B01D 46/24* (2006.01)

(52) U.S. Cl.
  CPC .......... *B01D 46/448* (2013.01); *B01D 46/46* (2013.01); *F01P 5/02* (2013.01); *F02M 35/086* (2013.01); *B01D 46/24* (2013.01); *B01D 2279/60* (2013.01)

(58) Field of Classification Search
  USPC ...... 55/302, 483, 484, 341.1, DIG. 34; 95/1, 95/19, 280; 96/417, 422
  See application file for complete search history.

(56) References Cited

U.S. PATENT DOCUMENTS

| | | | | |
|---|---|---|---|---|
| 4,824,450 A * | 4/1989 | Howard | ............ | B01D 46/0005 55/341.3 |
| 5,572,327 A * | 11/1996 | Plinke | ............ | G01M 3/38 96/417 |
| 6,875,256 B2 * | 4/2005 | Gillingham | .......... | B01D 46/521 55/482 |
| 8,075,674 B2 * | 12/2011 | Raether | .............. | B01D 46/2411 95/280 |
| 8,114,196 B2 * | 2/2012 | Lamee | ..................... | F02C 7/05 95/280 |
| 8,142,553 B2 * | 3/2012 | Tan | ........................ | F02M 35/02 55/385.3 |
| 8,747,533 B1 * | 6/2014 | Ekanayake | ........ | B01D 46/0086 96/417 |
| 10,543,443 B2 * | 1/2020 | Hoff | ........................ | B08B 5/04 |
| 2007/0039464 A1 * | 2/2007 | Vanderhoof | .............. | F24F 3/14 95/45 |
| 2008/0014856 A1 | 1/2008 | Voit et al. | | |
| 2009/0107337 A1 * | 4/2009 | Vu | ........................ | B01D 46/71 95/279 |
| 2011/0314776 A1 * | 12/2011 | Bloom | .................. | B01D 53/24 55/392.1 |
| 2012/0073251 A1 | 3/2012 | Troxell et al. | | |
| 2013/0239802 A1 | 9/2013 | Troxell | | |

OTHER PUBLICATIONS

European Patent Office, International Search Report related to International Patent Application No. PCT/IB2021/056508, dated Oct. 22, 2021, 13 pages.

* cited by examiner

SELF-CLEANING AIR FILTER SYSTEM

CROSS-REFERENCE TO RELATED APPLICATIONS

This application is a national phase entry under 35 U.S.C. § 371 of International Patent Application PCT/IB2021/056508, filed Jul. 19, 2021, designating the United States of America and published in English as International Patent Publication WO 2022/029533 A1 on Feb. 10, 2022, which claims the benefit of the filing date of U. K. Patent Application 2012138.0, filed Aug. 5, 2020, the entire disclosure of each of which is incorporated herein by reference.

FIELD

The present disclosure relates to vehicle air filtration systems and methods for operation of the same especially, but not exclusively, filtration systems for vehicles such as powered farm machines operating in dusty environments.

BACKGROUND

As is well known, it is important for vehicles to be provided with one or more filters in the air intake to prevent dust and other damaging particulate matter from being drawn into the engine. In automobiles, the air filters used do not tend to become quickly clogged and may only need replacing during the regular service intervals of the vehicle. For working vehicles such as tractors or combine harvesters, which tend to operate in very dusty environments, filter clogging or blocking can very quickly lead to reduced performance, and frequent stops to clean or replace filters is economically damaging.

To address the issue, a number of self-cleaning filter systems have been developed which act to remove accumulated dust and dirt from filter surfaces while the vehicle continues to operate, reducing downtime for the vehicle and increasing the intervals between the replacement of filters. Many self-cleaning filters use some kind of vacuum cleaner to clean the filter. Sometimes the filter rotates but it is also known to design the cleaning device in a rotating manner.

European patent application EP 1 035 308 A1 describes a self-cleaning filter for a harvesting machine comprising a rotating vacuum device on top of the filter to remove the dirt. It is disclosed that it is not necessary to clean always but to clean in certain periods or phases which can be initiated based on certain parameters based on the data measured by sensors. These parameters can be the air pressure at the inlet of the fan or the temperature of the cooling water.

European patent application EP 2 147 712 A1 discloses a method to unblock a perforated rotary filter screen by applying a stream of high pressure air on the filter screen and moving it in a transverse direction. Together with the rotation of the filter element it is cleaned in a helical or spiral path. The stream can be either directed from the upstream or the downstream side of the filter element, but it is better according to the patent to apply it from the upstream side.

International patent application WO 2018/001894 A1 discloses a filter element to which a pressure pipe of a mobile cleaning device can be attached. With this pipe a cleaning fluid can be injected into the filter element in form of multiple pulses of compressed air. The connection piece at which the pressure pipe is attached is closed if the pipe is not attached.

United States patent application US 2012/0073251 A1 discloses a self-cleaning air filter system with two phases, a working phase and a cleaning phase. The filter element comprises a casing, a filter exterior and a filter interior. A vent is located inside of the filter. In the working phase, a negative pressure exists inside of the filter to pull air inside. A positive pressure is applied during the cleaning phase by a valve inside of the duct, which applies an air blast into the vent and onto a deflector. The deflector redirects the air radially to the filter. The pressure created by the blast is kept alive with the duct, because it is not compensated so fast. The blast of air can be applied automatically, periodically, or manually.

Chinese patent application CN 209354273 U discloses an air filter system with a self-cleaning function. A first air source and a first air valve is used to dislodge dirt located on the filter element. A second air source and a second valve is used to create an air stream to the outside. The filter exterior with the dislodged dirt is connected to this stream with an outlet pipe. With the Venturi effect, the dusty air is pulled to the air stream and out of the vehicle.

It is an object of the invention to provide an improved method of operating a self-cleaning filter system.

BRIEF SUMMARY

In accordance with a first aspect of the present invention there is provided a method of operating a cleaning process on a filter in a vehicle air intake, comprising:
passing air through the filter from an upstream side to a downstream side;
providing an exhaust duct having an inlet end adjacent the upstream side of the filter and an extraction device arranged to draw air through the exhaust duct from the inlet end to the outlet end; and
repeatedly performing a cleaning subroutine, which cleaning subroutine comprises, in sequence:
operating the extraction device to increase the flow of air through the exhaust duct;
applying a pulse of pressurized fluid to a downstream side of the filter;
carrying away by the exhaust duct material dislodged from the upstream side of the filter as a result of the applied pulse; and
operating the extraction device to decrease the flow of air through the exhaust duct.

Increasing the flow of air through the exhaust duct to increase suction at the same time as applying one or more pulses of pressurized fluid (preferably gas or air) to the downstream side of the filter in order to dislodge accumulated dust and debris on the upstream side of the filter notably improves the efficiency of the dust and debris removal process. The advantage of using pressurized fluid pulsation is that, unlike some known systems, it is not necessary to stop the airflow to the engine while the flow is reversed to actively blow backwards (from downstream to upstream) through the filter.

Note that the terms "upstream" and "downstream" are used herein in the context of the usual direction of airflow as the vehicle operates. Hence, the air intake opening to the atmosphere is upstream of the filter, and the engine receiving filtered air is downstream of the filter.

As noted above, the cleaning subroutine steps of applying a pulse and carrying away material may be repeated at least once prior to the step of decreasing the flow of air through the exhaust duct. In an embodiment, the cleaning subroutine steps of applying a pulse and carrying away material are repeated more than once prior to the step of decreasing the flow of air through the exhaust duct.

In an embodiment, the extraction device for generating a flow of air through the exhaust duct comprises a fan located adjacent the outlet end of the exhaust duct and wherein the step of increasing the flow of air through the exhaust duct from the inlet end to the outlet end comprises increasing the rotational speed of the fan and the step of the decreasing the flow of air through the exhaust duct from the inlet end to the outlet end comprises decreasing the rotational speed of the fan. The speed of the fan may be increased from a first speed to a second speed to increase the flow of air through the exhaust duct. The speed of the fan may be decreased from the second speed to the first speed to decrease the flow of air through the exhaust duct.

In a preferred arrangement, the method further comprises using as the fan a cooling system fan of the vehicle, which cooling system fan is arranged to cool one or more components of the vehicle. Using an existing fan of the vehicle reduces component count and enables a relatively more compact arrangement in the vehicle engine bay.

In alternative embodiments, the extraction device arranged to draw air through the exhaust duct from the inlet end to the outlet end may be any one of the following: a venturi system, a flutter valve, or an exhaust ejector.

Preferably, the method further comprises monitoring a filter load of the air filter, comparing the filter load with a filter load threshold, and initiating performance of the cleaning subroutine when the filter load threshold is reached or exceeded. In such an arrangement where the threshold is reached or exceeded, it is preferred to increase the filter load threshold after each performance of the cleaning subroutine (up to a maximum filter load threshold level) in recognition of the fact that the cleaning subroutine will not remove 100% of the accumulated dust and debris. Without periodic increase of the initial (lowest) threshold level, the time taken to reach the threshold level would shorten with each cycle, leading to inefficient operation as the cleaning subroutine (including increased fan speed and pulsation) is performed with increasing frequency. Suitably, an indication to change the filter is generated, such as in the form of a warning light or message in the vehicle cab, when the maximum filter load threshold is reached or exceeded. If the threshold is not reached then it is not entirely necessary to increase the threshold after each cleaning subroutine. It is also possible to maintain the threshold on the same level or lower it.

The method may comprise recording when (or otherwise noting how often) the cleaning subroutine is performed and generating an indication to change the filter after a predetermined number of iterations of the cleaning subroutine.

The triggering of the cleaning subroutine may be performed automatically at predetermined intervals, it may be triggered semi-automatically (e.g., the user may be presented with an indication that cleaning is now due, which indication they can follow or ignore), or it may be triggered manually. These intervals can differ in their time lengths, and an interval may begin with a previous running of the subroutine triggered by the reaching of a filter load threshold.

In an embodiment, the method comprises using a weight sensor to measure the weight of the filter in order to determine the amount of contaminant held in the filter. The method may comprise triggering the cleaning subroutine when the weight of the filter reaches a stored threshold value.

In an embodiment, the method comprises using a particle sensor to determine the degree of soiling in air upstream of the filter and/or a vacuum sensor to detect the level of vacuum downstream of the filter. The method may comprise using data from the particle sensor and/or the vacuum sensor to determine the degree of contamination (i.e., clogging) of the filter. The method may comprise triggering the cleaning subroutine when the degree of contamination of the filter reaches a stored threshold value. The method may comprise generating an indication to change the filter when the degree of contamination of the filter reaches a further stored threshold value. The method may comprise triggering the cleaning subroutine when the degree of vacuum measured by the vacuum sensor reaches a stored threshold value. The method may comprise generating an indication to change the filter when the degree of vacuum measured by the vacuum sensor reaches a stored threshold value.

To reduce inefficiency, the method preferably further comprises blocking of the performance of the cleaning subroutine until a predetermined time (for example 10, 15 or 20 minutes) has elapsed since the preceding performance of the cleaning subroutine. The predetermined time may be a system variable that is determined by the ambient conditions: for example, in wet weather where there is less atmospheric dust being drawn in by the filter element, the minimum permitted period between cycles of the cleaning subroutine may be extended.

Preferably, the method further comprises determining one or more vehicle operating parameters (such as vehicle velocity, engine load, rotational speed or engine temperature, or pressure in a source of the pulse of pressurized fluid), comparing the same with respective stored threshold values, and blocking performance of the cleaning subroutine if a respective stored threshold value is not reached. This identifies circumstances in which it is inappropriate to trigger the cleaning subroutine, for example when there is insufficient pressure in the source of pressurized fluid to generate pulsation to a desired level. Blocking, by a user of the vehicle, of automatic initiation of the cleaning subroutine is suitably also enabled, for example to avoid blowing out clouds of dust as the vehicle passes through a populated area.

In an embodiment the method comprises receiving environmental data from an external source relating to one or more of the following for the region in which the vehicle is operating: weather forecast, the temperature, the air quality, the humidity. The method may also comprise reviewing recorded data from previous actions (for example: same cleaning procedure for the same or similar task). The method may comprise using the environmental and/or recorded data from previous uses to adjust the parameters of the cleaning subroutine such as the speed/force of the extraction device, increasing the force of pressure pulsations. The environmental data may be received from a server or other data source wirelessly.

In a further aspect, the invention provides a self-cleaning air filter system for a vehicle, comprising:
  an air filter within a filter housing, the filter housing having an air inlet and an air outlet, the air inlet configured to receive atmospheric air and deliver the same to the filter, and the air outlet configured to deliver air that has passed through the filter;
  a source of pressurized fluid and at least one conduit coupled to deliver the pressurized fluid from the source to the air outlet side of the filter;
  at least one valve operable to control the flow of pressurized fluid in the at least one conduit;
  a controller coupled to operate the at least one valve to deliver pulses of pressurized fluid to the air outlet side of the filter;

an exhaust duct having an inlet end and an outlet end, with the inlet end positioned within the filter housing air inlet; and an extraction device operable to draw air through the exhaust duct from the inlet end to the outlet end;

wherein the controller is configured to perform the cleaning subroutine as recited above.

For improved efficiency in manufacturing, the filter and filter housing and the source of pressurized fluid and at least one conduit are preferably constructed as a subassembly on a common supporting frame.

The extraction device may be a fan located adjacent the outlet end of the exhaust duct.

A vehicle including the above-described self-cleaning air filter system can use a cooling fan in a cooling system of the vehicle as the fan operable to draw air through the exhaust duct, which cooling fan is arranged to direct cooling air towards at least one radiator or heat exchanger on a downstream side of the cooling fan, with the outlet end of the exhaust duct being positioned on the upstream side of the cooling fan.

BRIEF DESCRIPTION OF THE DRAWINGS

The invention will now be described, by way of example only, in which.

DETAILED DESCRIPTION

Embodiments will now be described in the following detailed description with reference to the drawings, wherein preferred embodiments are described in detail to enable practice of the disclosure. Although described with reference to these specific preferred embodiments, it will be understood that the disclosure is not limited to these preferred embodiments. But to the contrary, numerous alternatives, modifications and equivalents will become apparent from consideration of the following detailed description.

Figure 1:
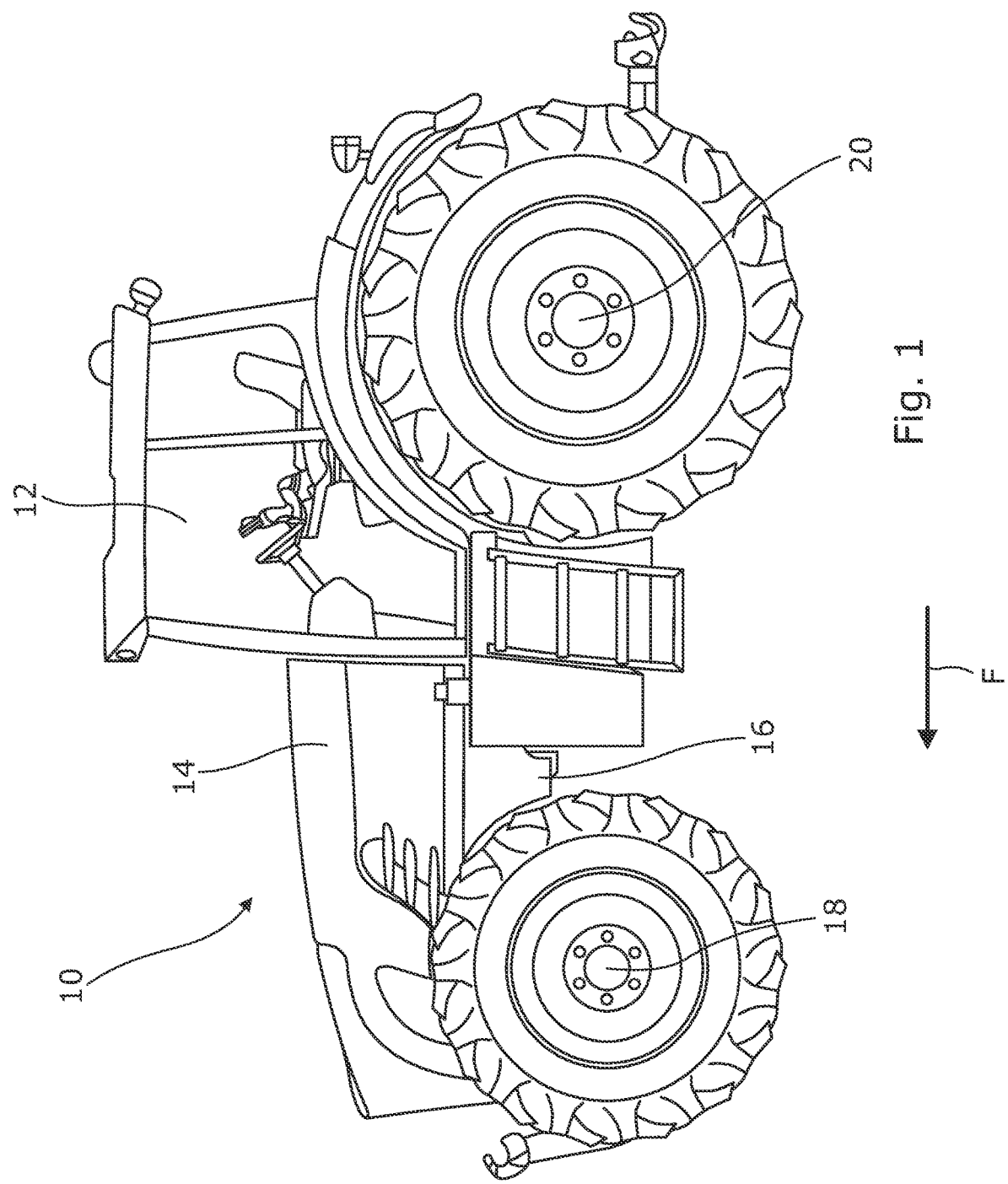
FIG. 1 shows a representation of a tractor.

Referring to FIG. 1, a utility vehicle in the form of a tractor 10 is shown having a cab 12 and an engine compartment 14. A chassis 16 which is partly visible connects front wheel suspension and steering assembly 18 and rear axle assembly 20. A forward direction of the tractor is indicated by the arrow F.

Figure 2:
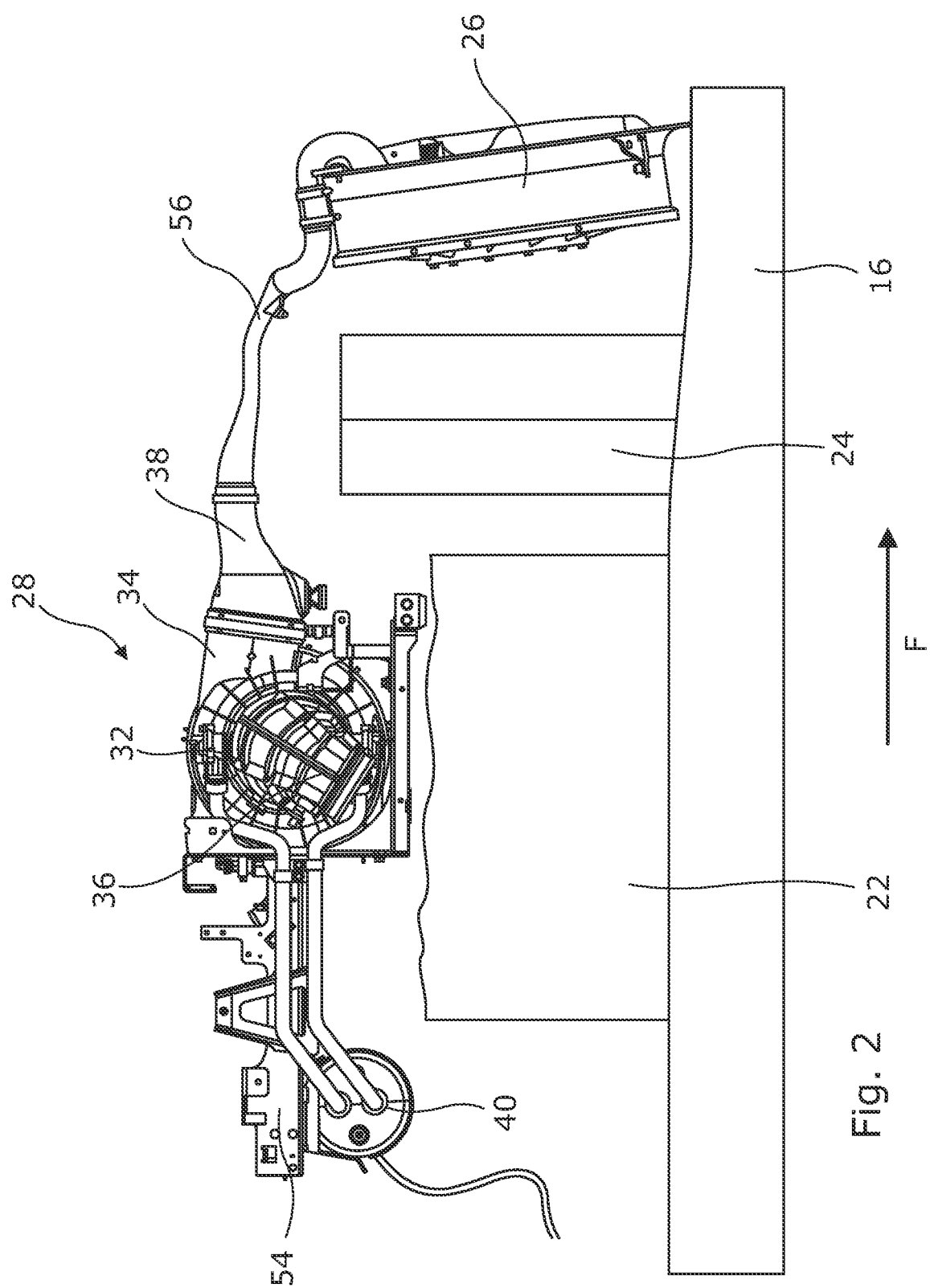
FIG. 2 shows additional components located within the engine compartment of the tractor of FIG. 1.

FIG. 2 schematically represents components within the engine compartment 14, with an engine 22 mounted on the chassis 16. Forward of the engine 22 is a cooling package 24 comprising one or more radiators in cooling circuits for fluids (water, engine oil) of the vehicle. Forward of the cooling package 24 is a cooling fan 26 which draws air through a vent or grille arrangement in the front of a hood assembly (not shown in FIG. 1) which surrounds the engine compartment 14. Air is blown from the fan 26 through the cooling package 24 to lower the temperature of the liquids.

Above the engine 22 is mounted a self-cleaning air filter subassembly, indicated generally at 28. The subassembly 28 comprises a filter element 30 within a filter housing 32, and number of other components (described below) mounted to a common mounting frame 54.

Figure 3:
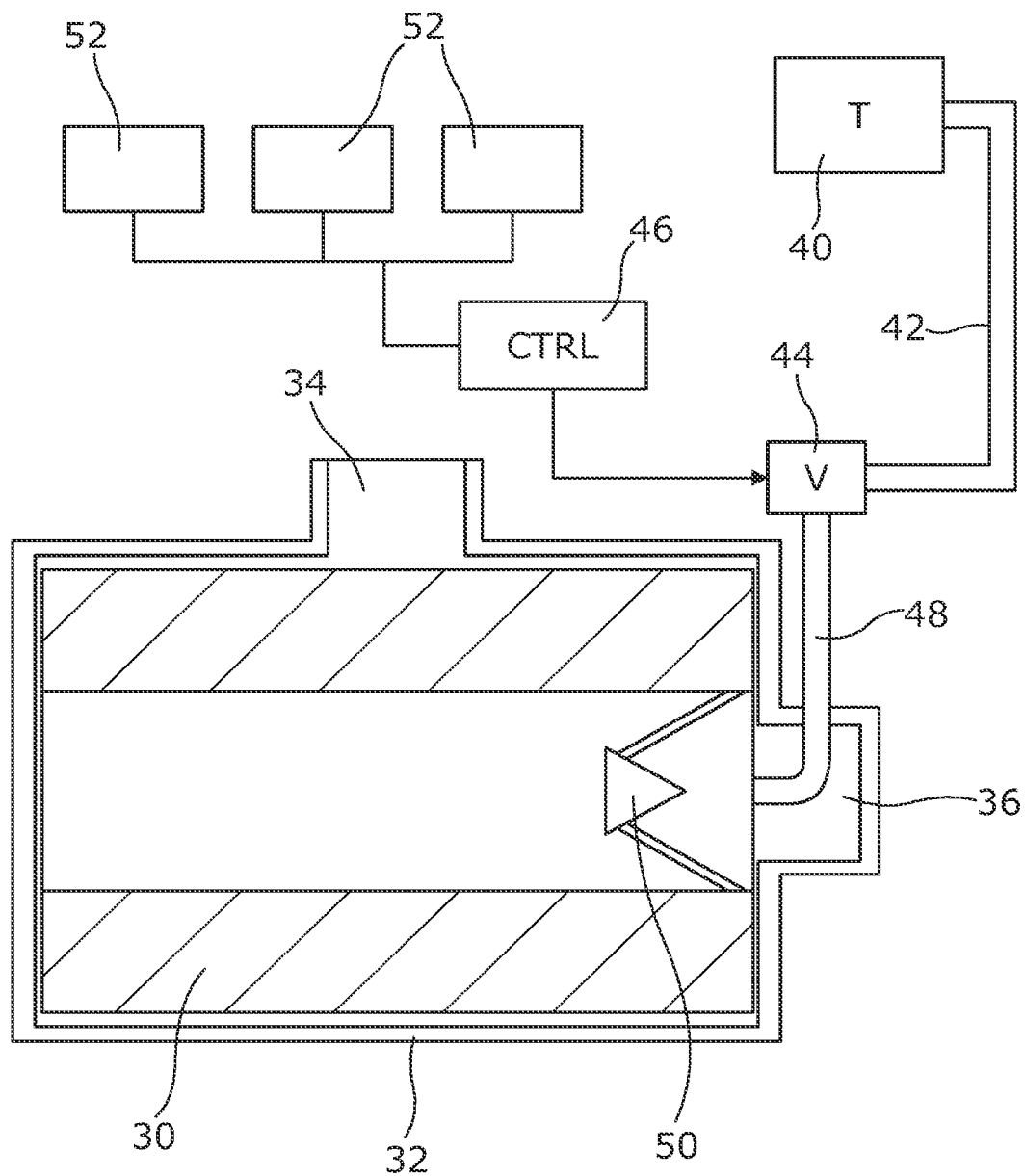
FIG. 3 schematically represents an air filter within a filter housing with means to provide pulsation.

FIG. 3 schematically represents the air filter 30 (in the form of a generally cylindrical annular filter element) within the correspondingly shaped filter housing 32. The filter housing 32 has an air inlet 34 and an air outlet 36. The air inlet 34 is provided with an extended inlet body portion 38 (FIG. 2) and is configured to receive atmospheric air and deliver the same to an external (upstream) surface of the filter 30. The air outlet 36 is configured to deliver air that has passed through the filter 30 to the engine 22.

Figure 4:
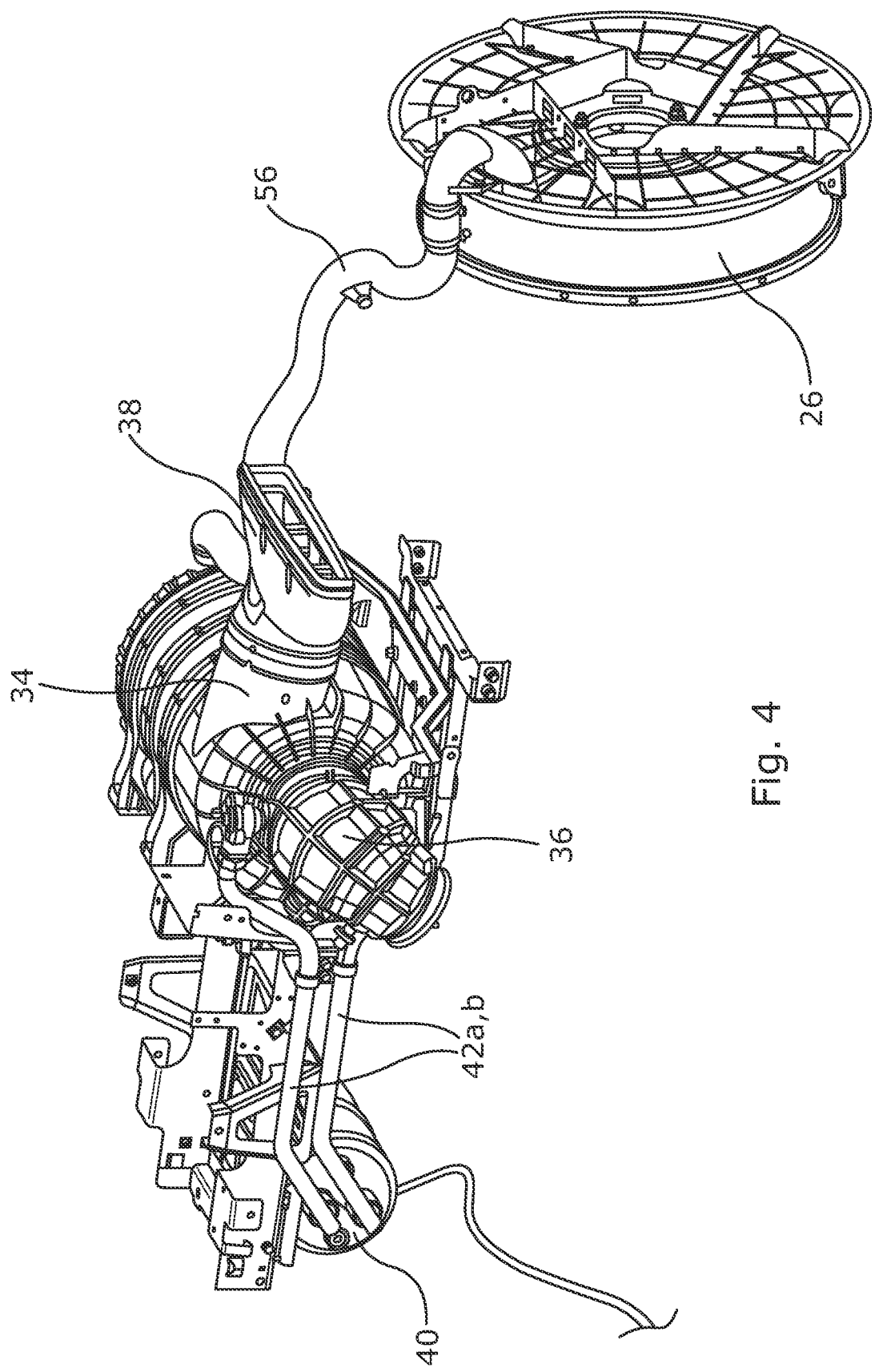
FIGS. 4 and 5 are perspective views of a self-cleaning air filter system located within the engine compartment of the tractor of FIG. 1.
Figure 5:
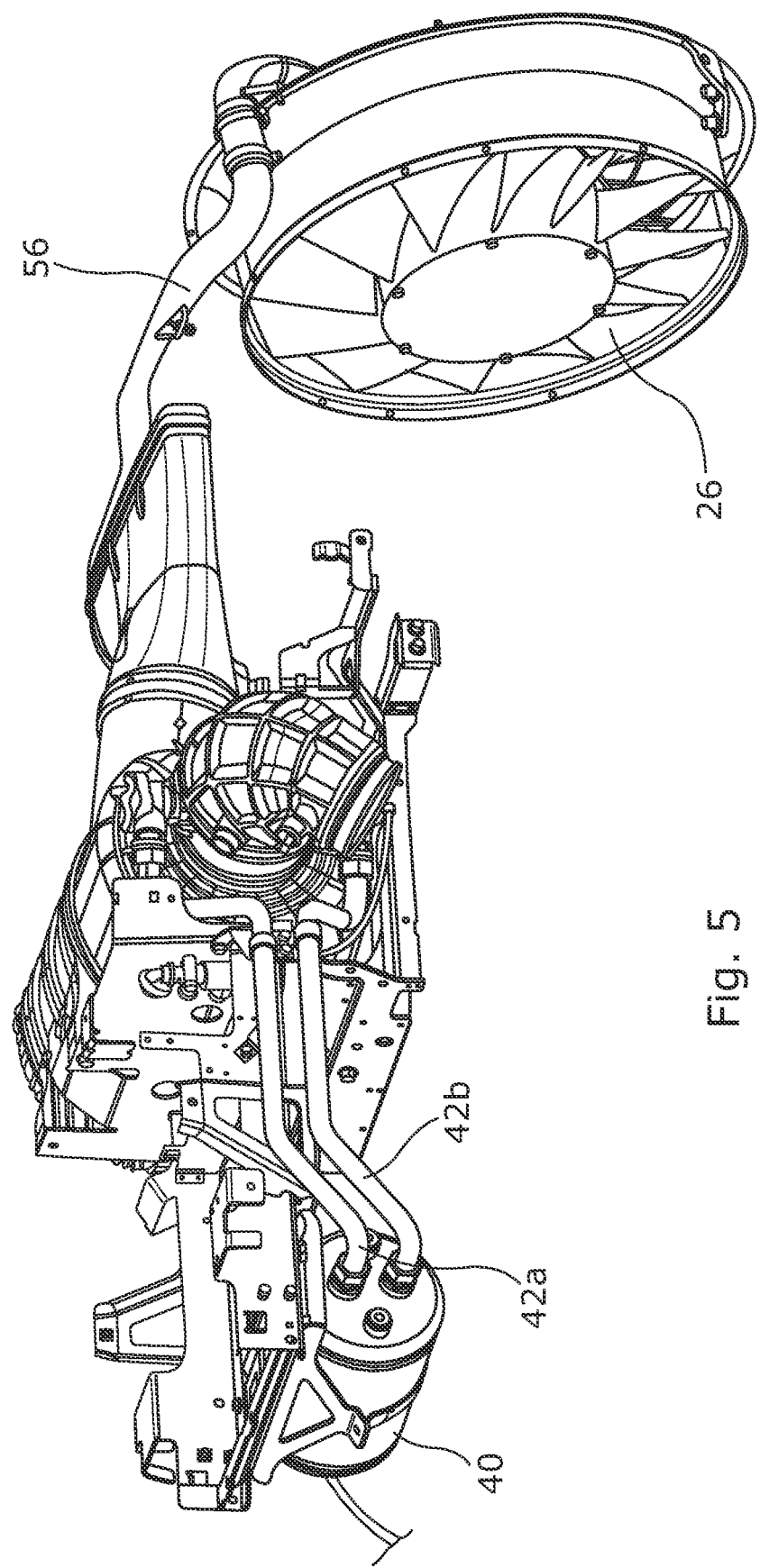

Referring additionally to FIGS. 4 and 5, a source of pressurized fluid 40 (gas or air) and at least one conduit 42 coupled to deliver the pressurized fluid from the source to the air outlet (downstream) side of the filter 30 is attached to the mounting frame 54. The source of pressurized fluid 40 may comprise an accumulator or reservoir, or may comprise a compressor. Whereas FIG. 3 shows a single conduit 42, the embodiment of FIGS. 4 and 5 has two conduits 42a, 42b which latter arrangement allows delivery of pressurized fluid to more than one location within the filter element 30.

Rather than reversing the airflow direction through the filter element 30 to blow accumulated dust and debris out of the filter element 30, the pressurized fluid source 40 is used to deliver a pulse of pressurized air into the airspace at the core of the annular filter element 30 which generates a shock wave which, in turn, serves to loosen dust and debris embedded on the outer surface of the filter.

To generate the pulse of pressurized air, the conduits 42, 42a, 42b include a valve 44 operated by a controller 46 to briefly connect the source 40 to the filter 30. A pulse tube 48 may be used to connect the conduit 42 to the interior of the filter 30, and a pulse distributor 50 mounted within the interior of the filter housing 32 may be provided to guide the shock wave resulting from the pulse to promote the loosening effect.

The controller 46 is suitably a programmable device programmable to carry out an operating method of the system as will be described below with reference to FIGS. 6 and 7. The controller 46 may be a stand-alone device, or it may form a subsystem of a general vehicle or engine control system of the host vehicle 10. In order to control some aspects of the method, the controller 46 is connected to a number of sensors 52 (FIG. 3) which detect a variety of vehicle operating parameters, such as engine 22 temperature and pressure output from the source 40.

An exhaust duct 56 has an inlet end and an outlet end. The exhaust duct 56 extends through the inlet extended body portion 38, and the inlet end of the exhaust duct 56 is positioned within the filter housing air inlet 34. The outlet end of the exhaust duct 56 is positioned on the upstream side of the vehicle cooling fan 26, so that operation of the fan 26 to direct cooling air towards the cooling package 24 will also draw air along the exhaust duct 56 from the inlet to the outlet including any loose dust or dirt on the surface of the filter element 30.

In order to enhance cleaning efficiency, the controller 46 is programmed or otherwise configured to cause the system to periodically perform a cleaning subroutine in which, while one or more pulsations are introduced to the downstream side of the filter element 30, the operating speed of the cooling fan 26 is increased to increase the suction at the inlet end of the exhaust duct 56 as the pulsation shock-wave dislodges dust and dirt from the upstream side of the filter element 30.

Figure 6:
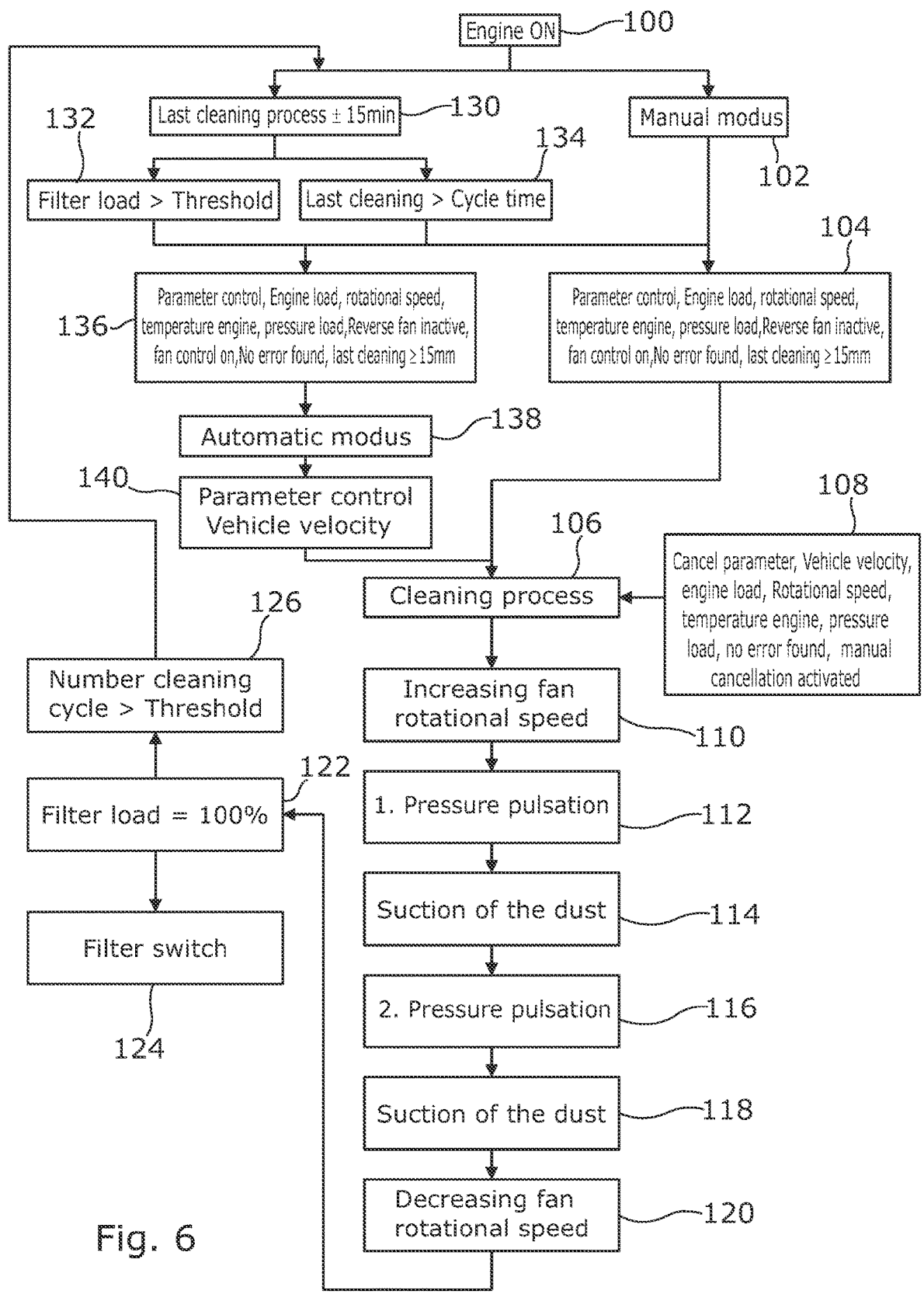
FIG. 6 is a flow chart illustrating operation of the self-cleaning air filter system of FIG. 4 and FIG. 5.

FIG. 6 is a flow chart representation of a cleaning process operation for the apparatus of FIGS. 1 through 5, starting at step 100 with determination that the vehicle engine is running. The chart then splits into two branches, in dependence on whether the process is being triggered manually, by a user of the vehicle, or automatically.

In the right-hand branch, it is determined at step 102 that a filter cleaning operation has been triggered manually. Following this, at step 104, a parameter control step determines a number of vehicle operating parameters (for example by sensors 52; FIG. 3) that may determine whether the cleaning process can proceed. Such parameters may include:

Engine load—the engine should operate in normal operating conditions to prevent unnecessary damage;

Engine rotational speed—as for the engine load, the engine should operate in normal operating conditions to prevent unnecessary damage;

Engine temperature—if the engine temperature is below a threshold level, it may be taken as an indication that the filter element is not blocked and that cleaning is not required;

Pressure load—if the air pressure from source 40 is insufficient to generate a pulse, the cleaning process may be stopped until pressure is restored to a threshold level;

Reverse fan inactive—if the cooling fan 26 is reversible (for example to dislodge dust and debris from a front grille of the engine compartment 14) the cleaning process should be blocked when the fan is in reverse mode as the exhaust duct 56 would be unable to draw separated dust and dirt from the surface of the filter element;

Fan control on—controllable variation of the cleaning fan 26 speed by the controller 46 must be enabled to satisfactorily perform the cleaning subroutine (described below);

No error found—all components in the systems have to work. If a critical component, for example a sensor or the control, sends an error message, then the cleaning subroutine is not activated to prevent damage;

Last cleaning ≥15 minutes—it is inefficient to run the cleaning process too frequently, and the process may be blocked if less than a predetermined time has elapsed since the previous performance.

Following completion of the parameter control check at step 104, the process moves to initiating the performance of a cleaning subroutine at step 106. The initiating is prevented if a cancel parameter is identified at step 108, which cancel parameter may indicate the existence of a negative determination from any of the parameter control checks at step 104, or an input indicating that the user has activated a manual cancellation of the process.

When initiated, the cleaning subroutine comprises firstly increasing the rotational speed of the cleaning fan 26 at step 110. The increase may be 5-10% or may be substantially higher.

Next, a first pressure pulsation is applied to the filter element 30 at step 112, and the dust and debris dislodged by the pulsation is carried away by the exhaust duct 56 at step 114. Though only a single pulsation may be used, it is generally preferable to repeat the steps of pulsation and carrying away at least once, as indicated at steps 116 and 118. The cleaning subroutine concludes at step 120 with the rotational speed of the cooling fan 26 being reduced to its original level, that is to say the level prior to step 110.

Following completion of the cleaning subroutine of steps 110-120, a check with a vacuum sensor is made at step 122 of the filter load.

As will be recognized, the cleaning subroutine cannot be 100% effective at removing dust and debris from the filter element and, over time, the extent to which the filter element becomes permanently blocked to airflow increases. FIG. 7 is a graph showing air filter loading as a percentage value (vertical axis) over a period of vehicle operation punctuated by periodic performances of the cleaning subroutine (cleaning counter—horizontal axis).

Figure 7:
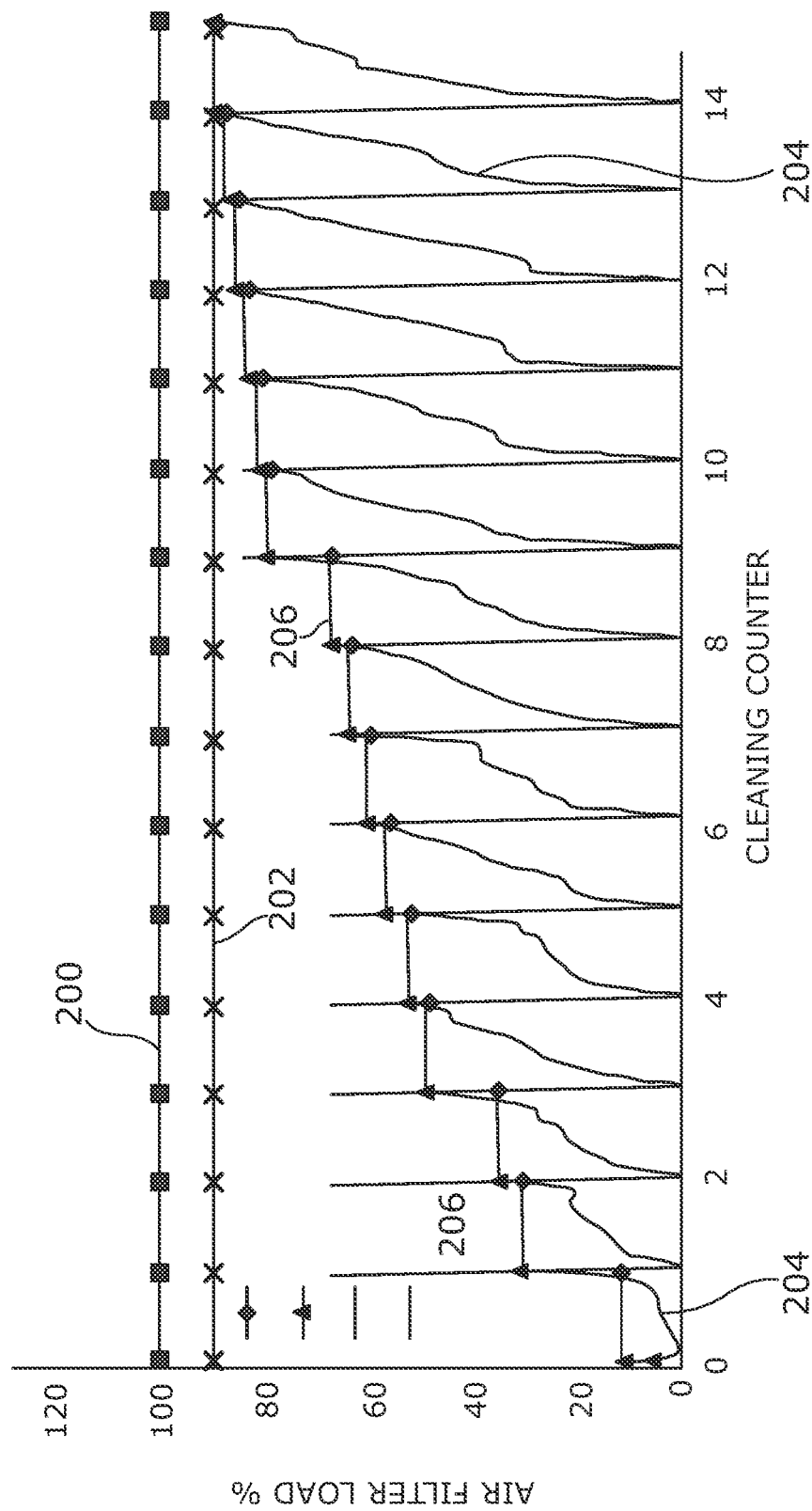
FIG. 7 is a graphic representation of variation in filter load threshold level over the course of a series of self-cleaning operations; and, FIG. 8 is a sematic representation of an alternative embodiment a self-cleaning air filter system in accordance with an aspect of the invention.

In FIG. 7, the uppermost trace 200 represents 100% filter loading (i.e. a "full" filter). Below this, a second trace 202 at 90% filter loading indicates a maximum level used when in automated operation (described below) to provide an operational safety margin. A third trace 204 represents instantaneous filter loading: as can be seen, after each performance of the cleaning subroutine, the filter loading drops back towards zero. However, as can also be seen, for each successive period of operation (between cleaning subroutines), the filter loading rises more sharply than the preceding period as the extent to which the filter is permanently blocked increases.

A fourth trace 206 in FIG. 7 represents a filter load threshold. As will be described below, in an automated mode, initiating performance of the cleaning subroutine may occur when the filter load 204 reaches or exceeds this threshold 206. Furthermore, recognizing how the extent of permanent filter blocking increases over time, the method of operation includes increasing the filter load threshold 206 after each performance of the cleaning subroutine up to a maximum filter load threshold level, suitably trace 202 in automatic operation, with trace 200 (100% loading) permitted only for a manually-initiated (override) operation.

Reverting to FIG. 6, following the completion of a cleaning subroutine, if step 122 determines that the filter load has reached 100% (or trace 202 for automatic operation), an indication is generated to the user at step 124 that the filter element needs to be replaced.

In an addition or alternative to the filter load check at step 122, a check of the number of iterations of the cleaning subroutine may be performed at step 126 and that number compared to a stored threshold value. In the loading monitoring example of FIG. 7, it can be seen that maximum loading has been reached after 14 cycles of the cleaning subroutine (although in practice the number of cycles will be much higher), so a maximum number of iterations (e.g., 12, 15, 18 or 20) may be specified, following which the indication is generated to the user at step 124 that the filter element needs to be replaced, regardless of filter load level. This arrangement has benefit for simpler systems where filter load level is not monitored, but instead the cleaning subroutine is triggered on a timed basis (e.g., once every 15, 20 or 25 minutes of operation).

As indicated above, performance of the cleaning subroutine may be triggered automatically, and this is represented in FIG. 6 by step 130 (following the engine on check 100) which determines whether a sufficient interval (e.g., 15 minutes) has elapsed since the last performance. Following a positive determination at step 130, one or both of a pair of precondition checks are made at steps 132 and 134.

Whether the filter load is greater than threshold in step 132 (e.g., whether trace 204 exceeds the currently applied threshold value 206 in the arrangement of FIG. 7);

Whether the period since the last cleaning cycle has reached or exceeded a periodic cycle time for successive performances of the cleaning subroutine.

Assuming a positive outcome, a parameter control check (equivalent to that at step 104) is performed at step 136, following which automatic operation is confirmed at step 138.

A further parameter check as to the vehicle velocity (optionally via sensors 52) is performed at step 140 before initiation of the cleaning process at step 106 and the check of cancellation parameters at step 108 so a cleaning subroutine doesn't happen when the vehicle is in the garage or is standing in a city at a traffic light. The reason behind this is so an unlucky pedestrian isn't blasted with a dust cloud or the dust is distributed in the garage.

In the foregoing, the applicants have described a method of operating a cleaning process on a filter in a vehicle air intake, comprises passing air through the filter from an upstream side to a downstream side, and providing an exhaust duct having an inlet end adjacent the upstream side of the filter and an outlet end adjacent a cooling fan of the vehicle arranged to draw air through the exhaust duct from the inlet end to the outlet end. In a periodic cleaning subroutine, the rotational speed of the cooling fan is increased 110 from a first speed to a second speed, while a pulse of pressurized fluid is applied 112, 116 to a downstream side of the filter, and the exhaust duct carries away 114, 118 material dislodged from the upstream side of the filter by the applied pulse, before the rotational speed of the fan is reduced 120 to its original level.

Figure 8:
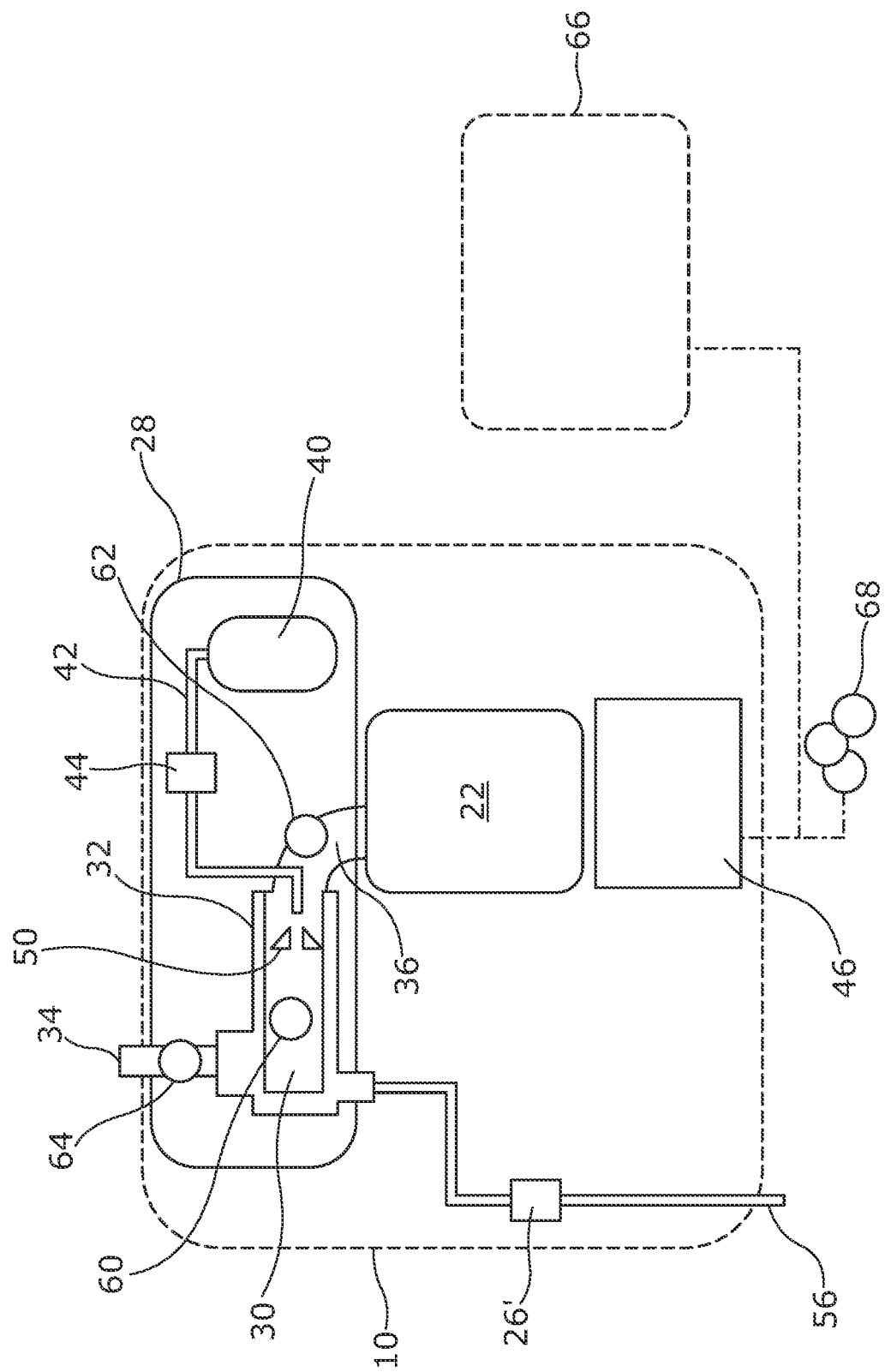

FIG. 8 illustrates an alternative embodiment of the self-cleaning filter arrangement in accordance with the invention. The embodiment as illustrated in FIG. 8 is similar to the previous embodiment described above, to which the reader should refer for details. Only significant differences between the self-cleaning filter arrangement according to this further embodiment over that of the previous embodiment will be described in detail.

Whereas in the previous embodiment a cooling fan 26 of the vehicle is used as an extraction device to draw air through the exhaust duct 56, FIG. 8 illustrates how alternative forms of extraction device 26' for generating an air flow through the exhaust duct 56 to extract dust and debris can be used. Accordingly, in this further embodiment, the extraction device 26' can take any suitable form for drawing air through the exhaust duct and could be a venturi system, a flutter valve, or an exhaust ejector, for example.

FIG. 8 also illustrates a number of additional sensors which can be used to provide data input to the controller 46. These include a weight sensor 60 for measuring the weight of the filter 30, a vacuum sensor 62 to measure the vacuum downstream of the filter and/or a particle filter 64 to determine the degree of soiling (dust and debris contamination) in the air entering the filter.

In use, as the filter clogs its weight will increase and the controller 46 can be configured to use weight data from the data sensor 60 to monitor changes in the weight of the filter in order to determine when a cleaning subroutine should be triggered and/or the filter replaced. In an embodiment, the controller 46 is configured to trigger the cleaning subroutine when the weight of the filter reaches a stored threshold limit. In an embodiment, the controller 46 is configured to trigger a warning that filter should be changed when the weight of the filter reaches a stored maximum threshold limit for the weight of the filter.

The level of vacuum downstream of the filter will also increase as the filter clogs and in an embodiment the controller 46 monitors vacuum data from the vacuum sensor 62 to determine how clogged the filter is. In an embodiment, the controller 46 is configured to trigger the cleaning subroutine when the measured vacuum reaches a stored threshold limit. In an embodiment, the controller 46 is configured to trigger a warning that filter should be changed when the measured vacuum reaches a maximum threshold limit.

In an embodiment, the controller 46 monitors data from the particle sensor 64 and uses this data to predict how clogged the filter is and/or to vary the frequency with which the cleaning subroutine is carried. Thus when the vehicle is being operated in very dusty conditions as determined from data received from the particle sensor, the controller may increase the frequency of the cleaning subroutine compared to when the vehicle is being operated in clean air.

The controller 46 may also use data from any of the weight, vacuum, and/or particle sensors to predict when a filter change may be required to provide predictive maintenance. The data from the sensors may be combined with data relating to vehicle usage, e.g., engine operating hours. For example, the controller 46 can be configured to record data regarding the degree of contamination of the air entering the filter from the particle sensor over time and/or in relation to time of use of the vehicle (e.g., engine operating hours) to predict when the filter is likely to be blocked based on data obtained from previous use of the filter in similar conditions. Such data may be acquired by the controller 46 itself during runtime of the system or acquired externally, such as though controlled testing of the air filter system, and downloaded or otherwise made available to the controller 46. The controller 46 can be configured to generate a warning signal to change the filter when it determines this to be necessary and may even be configured to automatically order a replacement filter, such as from a dealer, using a predictive maintenance protocol.

It will be appreciated that a self-cleaning air filter system may include any one or more of the weight, vacuum, and/or particle sensors in any combination and that such sensors can be incorporated into the previous embodiment. It will also be appreciated that the controller 46 may be configured to use data obtained from any two or more of the sensors in combination in order to determine when a cleaning subroutine should be triggered and/or the filter replaced.

In addition to using data provided by sensors on-board the vehicle, additional data may be provided to the controller 46 from external sources, such as a databank server 66 in communication with the controller. Such additional data may include environmental data (indicated schematically at 68) relating to the area or region in which the vehicle is operating at any given time. Such environmental data may include any one or more of the following: weather forecast, the temperature, the air quality, the humidity. The additional data may also include measured data from previous use of the self-cleaning filter system under similar environmental conditions. This may be acquired by the controller 46 itself during runtime of the system or acquired externally, such as though controlled testing of the air filter system, and downloaded or otherwise made available to the controller 46.

In general the control system and controller 46 can be configured to receive and/or analyze data regarding the environment and the vehicle (condition or collective monitoring/diagnostic) related to the predictive maintenance of the filter. The controller can be configured to use the data to increase the rate of cleaning subroutines, and/or determine the need to replace a filter. The controller may also be configured to automatically adjust parameters of the cleaning subroutine such as the speed/force of the extraction device and/or the force of the pressurized air.

From reading the present disclosure, other modifications will be apparent to persons skilled in the art. Such modifications may involve other features which are already known in the field of vehicle air filtration systems and component parts therefore and which may be used instead of or in addition to features already described herein.

The invention claimed is:

1. A method of operating a cleaning process on a filter in a vehicle air intake, the method comprising:
    passing air through the filter from an upstream side of the filter to a downstream side of the filter;
    providing an exhaust duct having an inlet end adjacent the upstream side of the filter and an outlet end and an extraction device to generate an air flow through the exhaust duct from the inlet end to the outlet end;
    repeatedly performing a cleaning subroutine, wherein the cleaning subroutine comprises, in sequence:
        increasing the flow of air through the exhaust duct from the inlet end to the outlet end;
        applying a pulse of pressurized fluid to a downstream side of the filter;
        carrying away by the exhaust duct material dislodged from the upstream side of the filter as a result of the applied pulse; and
        decreasing the flow of air through the exhaust duct from the inlet end to the outlet end;
    monitoring a filter load of the air filter;
    comparing the filter load with a filter load threshold;
    initiating performance of the cleaning subroutine when the filter load threshold is reached or exceeded; and
    increasing the filter load threshold after each performance of the cleaning subroutine up to a maximum filter load threshold level.

2. The method of claim 1, wherein the cleaning subroutine comprises repeating the applying a pulse and the carrying away material at least once prior to the decreasing the flow of air through the exhaust duct from the inlet end to the outlet end.

3. The method of claim 1, wherein:
    the extraction device comprises a fan located adjacent the outlet end of the exhaust duct;
    the step of increasing the flow of air through the exhaust duct from the inlet end to the outlet end comprises increasing a rotational speed of the fan; and
    the step of the decreasing the flow of air through the exhaust duct from the inlet end to the outlet end comprises decreasing the rotational speed of the fan.

4. The method of claim 3, further comprising using as the fan a cooling system fan of the vehicle, wherein the cooling system fan is arranged to cool one or more components of the vehicle.

5. The method of claim 1, further comprising generating an indication to change the filter when the maximum filter load threshold is reached or exceeded.

6. The method of claim 1, further comprising recording when the cleaning subroutine is performed and generating an indication to change the filter after a predetermined number of iterations of the cleaning subroutine.

7. The method of claim 1, wherein the cleaning subroutine is performed automatically if a cleaning subroutine has not yet occurred within a predetermined interval.

8. The method of claim 1, further comprising blocking of the performance of the cleaning subroutine until a predetermined time has elapsed since a preceding performance of the cleaning subroutine.

9. The method of claim 1, further comprising determining one or more vehicle operating parameters, comparing the vehicle operating parameters with respective stored threshold values, and blocking performance of the cleaning subroutine if a respective stored threshold value is not reached.

10. The method of claim 9, wherein the vehicle operating parameters include at least one parameter selected from the group consisting of a load of an engine of the vehicle, a rotational speed of the engine of the vehicle, a temperature of the engine of the vehicle, and pressure in a source of the pulse of pressurized fluid.

11. The method of claim 1, further comprising enabling manual initiation of the cleaning subroutine by a user of the vehicle.

12. The method of claim 1, further comprising enabling blocking, by a user of the vehicle, of automatic initiation of the cleaning subroutine.

13. A self-cleaning air filter system for a vehicle, comprising:
    an air filter within a filter housing, the filter housing having an air inlet and an air outlet, the air inlet configured to receive atmospheric air and deliver the atmospheric air to the filter, and the air outlet configured to deliver air that has passed through the filter;
    a source of pressurized fluid and at least one conduit coupled to deliver the pressurized fluid from the source to the air outlet side of the filter;
    at least one valve operable to control the flow of pressurized fluid in the at least one conduit;
    a controller coupled to operate the at least one valve to deliver pulses of pressurized fluid to the air outlet side of the filter;
    an exhaust duct having an inlet end and an outlet end, with the inlet end positioned within the filter housing air inlet; and
    an extraction device operable to draw air through the exhaust duct from the inlet end to the outlet end;
    wherein the controller is configured to perform the method of claim 1.

14. The self-cleaning air filter system of claim 13, wherein the filter, the filter housing, the source of pressurized fluid, and at least one conduit are constructed as a subassembly on a common supporting frame.

15. The self-cleaning air filter system of claim 13, wherein the extraction device comprises a fan.

16. A vehicle comprising the self-cleaning air filter system of claim 13, wherein the extraction device operable to draw air through the exhaust duct is a cooling fan in a cooling system of the vehicle, which cooling fan is arranged to direct cooling air towards at least one radiator on a downstream side of the cooling fan, with the outlet end of the exhaust duct being positioned on the upstream side of the cooling fan.

* * * * *